May 24, 1949.  A. L. M. A. ROUY  2,471,123
CALORIC ADJUSTING
Filed June 2, 1945

INVENTOR.
Auguste L. M. A. Rouy
BY
Lyman E. Dodge
ATTORNEY

Patented May 24, 1949

2,471,123

UNITED STATES PATENT OFFICE 2,471,123

CALORIC ADJUSTING

Auguste Louis Marie Antoine Rouy,
New York, N. Y.

Application June 2, 1945, Serial No. 597,290

2 Claims. (Cl. 257—9)

This invention relates to a device for efficiently producing a particular temperature in desired bodies and spaces.

A principal object of this invention is the production of arrangements or assemblages of parts capable of being used to air condition a desired space and/or produce a proper temperature in a refrigerator and/or properly heat a body of water suitable for use as, for instance, a domestic hot water supply.

A further object of the invention is the production of a device of the type specified which may be operated by an electric motor or other source of power or may be started by an electric motor or other source of power and may then be continuously operated by a gas turbine.

Other objects and advantages will appear as the description of the particular physical embodiment selected to illustrate the invention progresses and novel features will be particularly pointed out in the appended claims.

Figure 1:
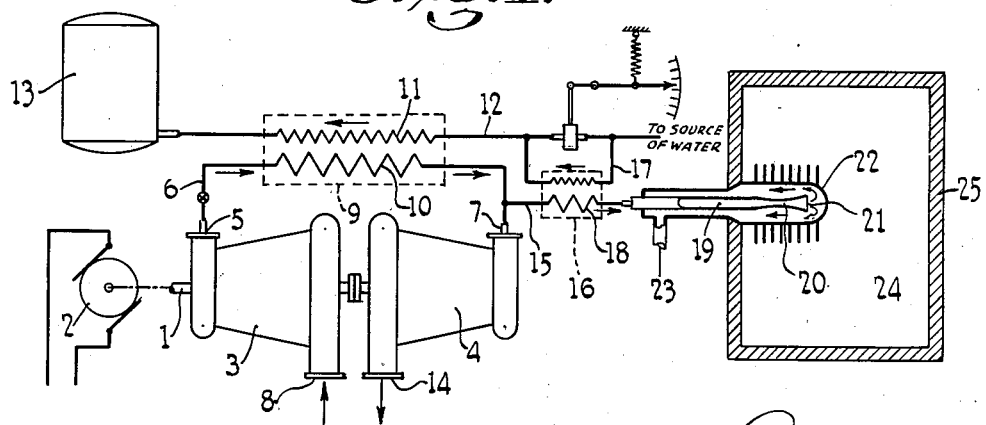
Figure 2:
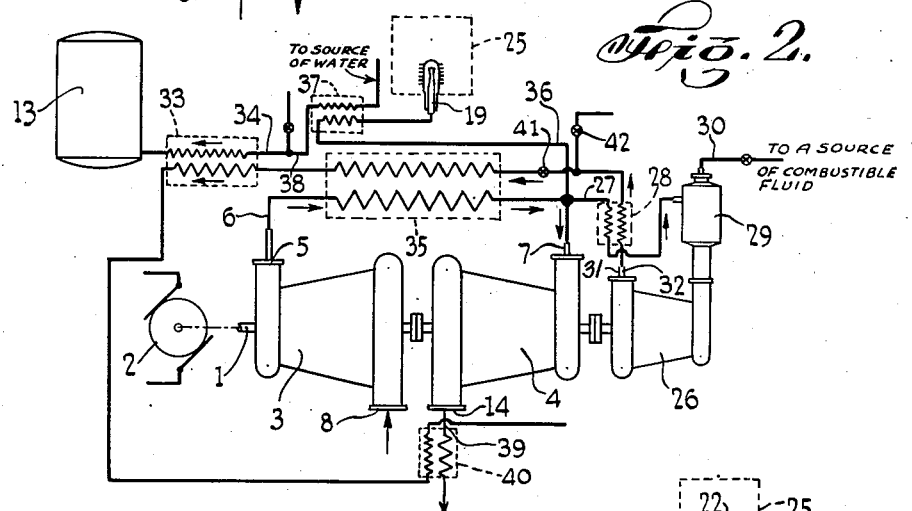
Figure 3:
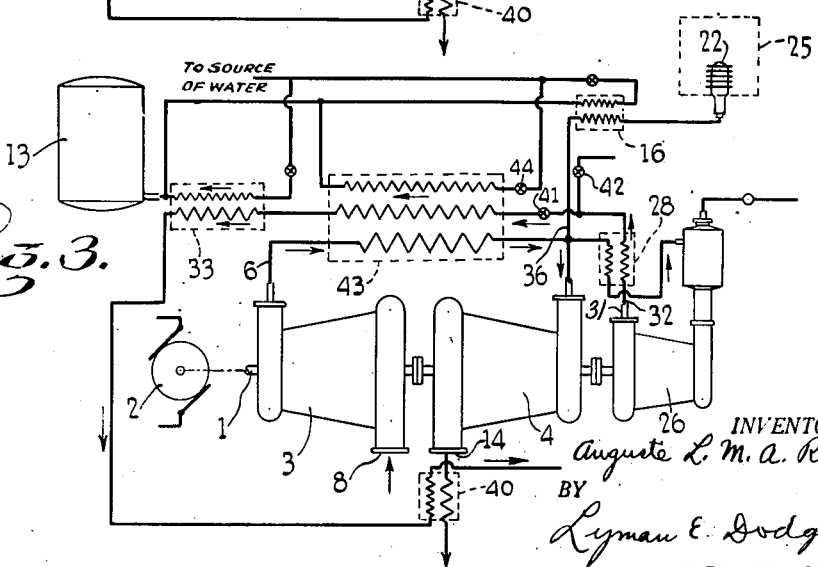

In describing the particular physical embodiment selected to illustrate the invention, reference will be had to the accompanying drawing, and the several views thereon, in which like characters of reference designate like parts throughout the several views, and in which:

Figure 1 is a diagrammatic or schematic view illustrating my invention as electric motor driven and used for producing hot water, cold air, and refrigeration; Fig. 2 is, likewise, a diagrammatic or schematic view illustrating my device used for producing hot water, hot air, and refrigeration by being driven continuously by a gas turbine and using an electric motor merely for starting; Fig. 3 is, likewise, a schematic or diagrammatic view illustrating my invention which may be used to produce either hot or cold air, hot water, and refrigeration.

My invention contemplates an arrangement and an assemblage of devices whereby ordinary air, drawn, if desired, from a space to be air-conditioned, may be employed as the vehicle by which caloric adjustments may be made.

My invention further contemplates that caloric adjustment will be made by performing an adiabatic compression on the air and allowing the air to expand adiabatically to produce power, utilizing at various points in the cycle suitable heat exchangers for adding or subtracting heat from the vehicle.

In addition to providing for the caloric adjustment of a desired space, I also advantageously and conveniently produce hot water which may be stored in a suitable tank and is utilizable as a domestic hot water supply.

In addition to the hereinbefore mentioned utilizations, I may, in addition, divert a portion of the compressed air, in a suitable way, to produce a caloric adjustment in a space enclosed by heat insulating walls which may simulate the ordinary household refrigerator or be used in a similar manner.

In the drawings, I have illustrated in Fig. 1, one exemplification of my invention. In Fig. 1, I designates a common shaft. To this common shaft is connected a prime mover 2 and also the rotor of a compressor 3 and a power turbine 4.

The outlet 5 of the compressor 3 is connected by a duct 6 to the inlet 7 of the power turbine 4.

If a fluid, such as air, taken, for instance, from a space to be calorically controlled, is drawn in at the inlet 8 of the compressor 3, it will be compressed adiabatically and issue from the outlet 5, and then passing through the duct 6 to the inlet 7 of the power turbine 4, will, in going through the power turbine 4, rotate the power turbine 4 and the common shaft 1 to which its rotor is connected.

The total expenditure of energy required of the prime mover 2 in keeping compressor 3 in continuous operation would merely be to supply the energy lost in the process.

I may use the arrangement of Fig. 1 for cooling the air. In this case, it may be assumed, that air, at 100° F., is taken in at the inlet 8 and issued at outlet 5 at a very much higher temperature. In order to accomplish my object and to waste the least energy possible, I pass the duct 6 through a heat exchanger 9. This heat exchanger may be of any of the usual or ordinary types but, of course, is preferred to be one of the most efficient heat exchanger types. In the drawing, I have diagrammatically illustrated the heat exchanger by showing zigzag pipe 10 interposed in duct 6 and in heat exchange relation with zigzag pipe 11 so that I can withdraw such heat as I need to withdraw from the fluid in duct 6 by passing a suitable cooling fluid through 11. I preserve the heat taken from the duct 6 by causing a source of water to be connected to a duct 12 in which the heat exchange element 11 is interposed and cause this duct to be connected to a water storage tank 13. By such construction the heat absorbed from the fluid in duct 6 is used to heat the water from the source flowing through duct 12 into the hot water storage 13. This hot water in the storage tank 13 may be used as a domestic hot water supply.

By suitably controlling the amount of heat abstracted from the fluid in the duct 6 I may have that fluid issue at a desirable lower temperature from the outlet 14 of the power turbine 4. The lower temperature will be obtained not only by reason of the heat abstracted from the fluid in duct 6 but also by the natural lowering of temperature of the fluid by reason of its expansion in the power turbine 4 so that it may well issue, if desired, at a temperature of 50° F.

I also consider it desirable to withdraw a certain amount of the fluid in duct 6 for the purpose of creating a proper low temperature in a refrigerator. To this end I connect the branch duct 15 to duct 6 between the heat exchanger 9 and the inlet 7 of the power turbine. It is desirable to withdraw further heat from the fluid which will be in duct 15, so I interpose a heat exchanger 16 and cause a portion of the water from the source to flow through the bypass 17 and so through the heat exchanger 16 in heat exchange relation to the walls of the device 18.

The fluid in duct 15 is delivered to a tube 19 which has a venturi 20 therein and has an open end 21. The fluid passing through the tube 19, and venturi 20 and issuing from the open mouth 21 comes in contact with the heat exchange wall 22 and then issued at the exhaust 23. In accordance with well known principles, the heat exchange walls 22 will be cooled and consequently the space 24 in which those walls are positioned will be cooled. To take advantage of this cooling, I provide that the heat exchanger 22 be positioned in a space 24 surrounded by heat insulating walls 25, such as those of an ordinary refrigerator, so that 25 may be called a refrigerator and may simulate the ordinary household refrigerator.

By the constructions and arrangements hereinbefore described, it will be understood that I have provided an assemblage of devices including a prime mover, a turbine compressor, a power compressor, a water storage tank, heat exchangers, and a venturi by which I am enabled, using ordinary air as the vehicle, to adjust the caloric content of water adapted for a domestic hot water supply, of air adapted for use in a living space, and air circulating in a space desired to be cooled and surrounded by heat-insulating walls which may well serve as a domestic refrigerator and that this has been accomplished by an expenditure of energy which is measured merely by the energy lost in the cycle.

In Fig. 2 I have shown a more extensive arrangement. In this arrangement I use the prime mover 2 merely to start the operation of the cycle, but continue the operation of the cycle by a gas turbine 26, placing the rotors of the compressor 3, the power turbine 4 and the gas turbine 26 on the common shaft 1.

In the arrangement as shown in Fig. 2, the vehicle or air may enter at the inlet 8 of the compressor 3 and issuing from the outlet 5 pass into duct 6 and so to the inlet 7 of the power turbine 4 and then issue from the outlet 14 thereof.

A part of the compressed air is taken out of duct 6 at the branch 27 and passed through the heat exchanger 28 to the combustion chamber 29 of the gas turbine 26. The combustible fluid enters the combustion chamber 29 by means of duct 30 and there combines with the compressed air received through duct 27. In order to enhance the heat of combustion, I pass the exhaust from the gas turbine 26 from its exhaust outlet 31 through a duct 32 and run this duct through the heat exchanger 28, so that the air from 27 entering the combustion chamber 29 is preliminarily heated.

In order to heat the water in the storage tank 13, I utilize the heat exchanger 33 which places the duct 32 from the exhaust of the gas turbine 26 in heat exchange relation to a duct 34 connected to a source of water.

In order to suitably regulate the temperature of the air issuing from power turbine 4, in case I desire to have air issue therefrom at an elevated temperature, I make use of the heat exchanger 35 in which the duct 6 is put in heat exchange relation with the duct 32 carrying the exhaust gases from the gas turbine 26. By suitable regulation of the amount of these exhaust gases which are allowed to pass through heat exchanger 35 I may so control the temperature of the fluid in duct 6 that even after expansion in power turbine 4 it may issue from the outlet 14 at an elevated temperature.

In order to provide for a refrigerator 25 I tap off from duct 6 with a duct 36 and cause this duct to have the heat exchanger 37 interposed therein. I also place water from the source going to the duct 38 in heat exchange relation with duct 36 in the heat exchanger 37, so that I thereby preserve the heat of the fluid in duct 36 and also suitably cool it so that it is in proper condition to go to the venturi 20 to effectuate cooling in the refrigerator 25.

In order to enhance the heating of the air issuing from outlet 14 and also preserve heat, I pass the exhaust from 14 through a duct 39 having interposed therein a heat exchanger 40 by which duct 39 is in heat exchange relation to the exhaust gases in duct 32.

In order to suitably adjust and control my arrangement, I make use of a valve, as 41, by which the quantity of exhaust gases flowing through heat exchanger 35 may be adjusted and also provide a valve 42 by which I may pass a portion of the exhaust gases from the power turbine 26 directly to atmosphere.

In Fig. 3 I have illustrated a prime mover 2, a common shaft 1 and compressor 3, power turbine 4 and gas turbine 26 all arranged substantially as shown in Fig. 2. I have also illustrated the refrigerator 25 and illustrated it as being controlled, as to heat condition, by taking compressed gas off from duct 6 by means of duct 36. I have also illustrated the heat exchanger 40, the heat exchanger 33 and the heat exchanger 28, all of which are connected and function as do the heat exchangers in Fig. 2.

In Fig. 3, however, I have a heat exchanger 43 in which the fluid in duct 6, the fluid in duct 32, and water from the source may be placed in heat exchange relation. By this arrangement, I might heat the fluid in duct 6, more or less, by manipulation of valves 41 and 42 or I may cool the fluid in duct 6, more or less, by manipulation of valve 44. By this arrangement I may take air in at inlet 8 and have it issue at exhaust 14 at any desired temperature so that the arrangement as shown in Fig. 3 is suitable for heating water through the year and cooling a refrigerator throughout the year and, in addition, cooling the air of a living room or like space in summer and heating the same space in winter. It is to be further observed that the prime mover 2 in Figs. 2 and 3 is only used to initially start the rotation of shaft 1. After it has been once started it is continued in rotation by power turbine 4 and assisted by such additional power as is needed by gas turbine 26.

Although I have particularly described one particular physical embodiment of my invention, nevertheless I desire to have it understood that the form selected is merely illustrative and does not exhaust the possible physical embodiments of the idea of means underlying my invention.

What I claim as new and desire to secure by Letters Patent is:

1. In a caloric adjusting device, including, in combination: a common shaft; a turbine compressor, a power turbine, and a gas turbine, provided with a combustion chamber, connected to the common shaft; a prime mover connected to the same common shaft whereby the prime mover may be utilized to initially rotate the common shaft and the power turbine may furnish part of the power needed to continue the rotation of the common shaft and the gas turbine may furnish the residue of power required; a hot water storage tank; an interconnecting duct between the outlet of the compressor and the inlet of the power turbine, and having a branch connected to the combustion chamber; a gas turbine duct connected to the outlet of the gas turbine and in heat exchange relation to the outlet from the power turbine; a source of water, two water supply ducts connecting the source of water and the hot water storage tank; a source of combustible fluid connected to the combustion chamber; an exhaust duct connected to the outlet of the power turbine; four heat power turbine exchangers, one interposed in the exhaust duct and the gas turbine exhaust duct, one interposed in the branch duct to the combustion chamber and the gas turbine exhaust duct, one interposed in one of the water supply ducts and the gas turbine exhaust duct, and one interposed in the other of the water supply ducts, the gas turbine exhaust duct and the interconnecting duct between the compressor and the power turbine whereby the compressor may be started initially by the prime mover and continued in operation by the gas turbine alone, but with the assistance of the power turbine and whereby the fluid compressed in the compressor is expanded in the power turbine to furnish power, part of the fluid heated by compression in the compressor is diverted to the combustion chamber of the gas turbine to furnish a heated combustion supporting fluid to combine with the combustible fluid supply to the combustion chamber of the gas turbine outlet whereby the fluid compressed in the compressor is in heat exchange relation to both the gas turbine and duct and one of the two water supply ducts and whereby the gas turbine duct is in heat exchange relation to the other of the water supply ducts and whereby the gas turbine outlet duct is in heat exchange relation to the power turbine exhaust whereby fluid of desired temperature may issue from the power turbine exhaust adapted for controlling the temperature of a desired space and hot water, adapted for domestic use, may be produced and stored, all with the expenditure of a minimum of energy.

2. In a caloric adjusting device, including, in combination: a common shaft; a turbine compressor and a power turbine connected to a common shaft; a prime mover connected to the same shaft whereby the power turbine may furnish a part of the power to drive the compressor and the prime mover may furnish the necessary additional power; a duct connecting the outlet of the compressor and the inlet of the power turbine; a heat exchanger interposed in said duct adapted to have a fluid passed therethrough whereby heat is absorbed by the fluid; means for storing said fluid after absorbing heat; a second duct connected to said first mentioned duct between the heat exchanger and the power turbine inlet, said second duct also having a second heat exchanger interposed therein; a portion of said fluid passing through the first mentioned heat exchanger passing initially through said second heat exchanger; a Venturi nozzle terminating said second duct, an exhaust chamber provided with heat exchange walls surrounding said Venturi nozzle; a heat insulated chamber in which said exhaust chamber is positioned whereby a fluid may be drawn into the inlet of said compressor, compressed with elevation of temperature, then cooled by passing through the first said heat exchanger, giving up a portion of its heat for producing hot water adapted for a domestic hot water supply, then expanded with resulting cooling in said power turbine, generating power to partially drive said compressor, and issue from the outlet of said power turbine adapted for cooling a living space and sufficient compressed fluid may be diverted through said second duct and second heat exchanger to enable the venturi to be sufficiently supplied to suitably reduce the temperature of a domestic refrigerator and the heat absorbed in the second heat exchanger may be used to augment the heat of the domestic hot water supply.

AUGUSTE LOUIS MARIE ANTOINE ROUY.

REFERENCES CITED

The following references are of record in the file of this patent:

UNITED STATES PATENTS

| Number | Name | Date |
|---|---|---|
| 1,879,685 | Jacko | Sept. 27, 1932 |
| 1,978,837 | Forsling | Oct. 30, 1934 |
| 2,095,984 | Holzwarth | Oct. 19, 1937 |
| 2,361,887 | Traupel | Oct. 31, 1944 |
| 2,374,510 | Traupel | Apr. 24, 1945 |
| 2,409,159 | Singleton | Oct. 8, 1946 |